(No Model.)
J. H. FROST.
PLOW FENDER.
No. 549,508. Patented Nov. 12, 1895.
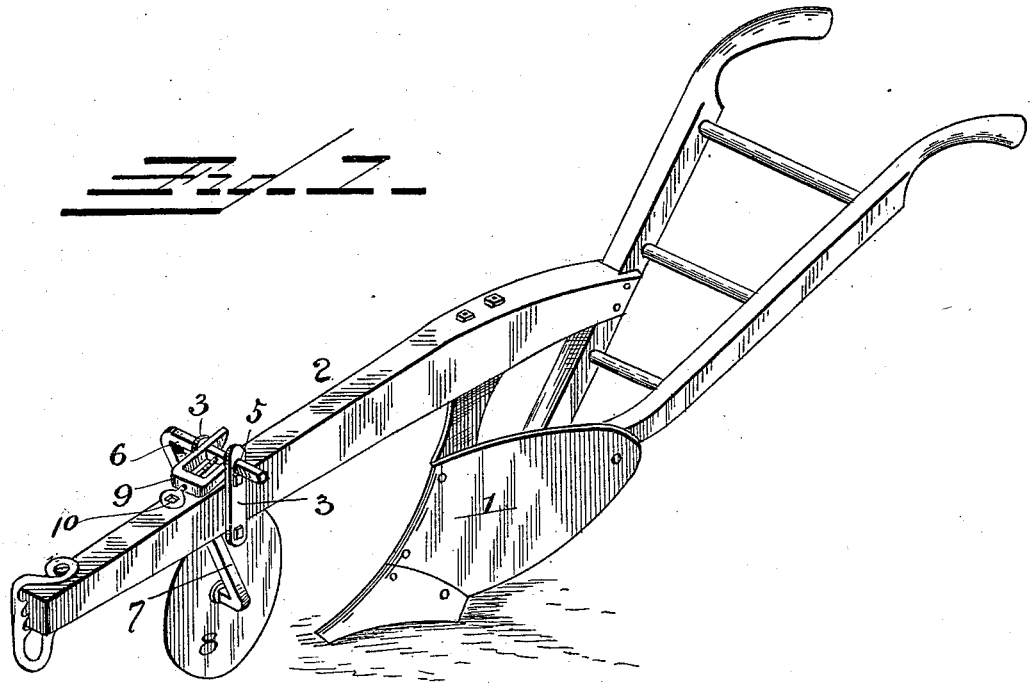
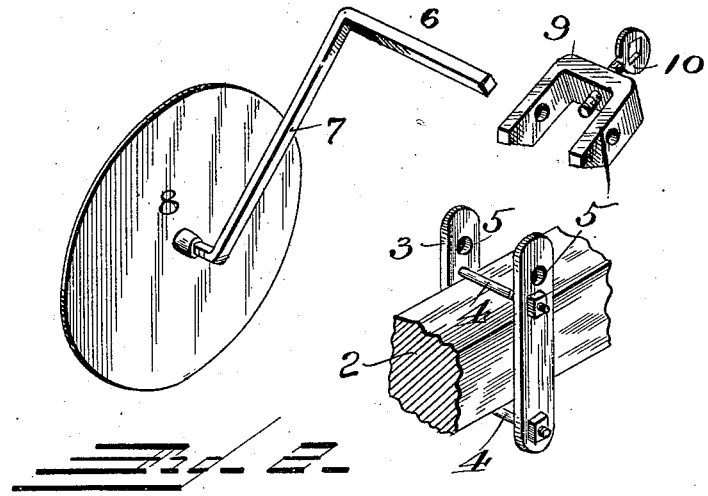
WITNESSES
INVENTOR
John H. Frost,
By
Attorney

United States Patent Office.

JOHN H. FROST, OF SIX MILE, ALABAMA.

PLOW-FENDER.

SPECIFICATION forming part of Letters Patent No. 549,508, dated November 12, 1895.

Application filed July 6, 1895. Serial No. 555,098. (No model.)

*To all whom it may concern:*

Be it known that I, JOHN H. FROST, a citizen of the United States, residing at Six Mile, in the county of Bibb and State of Alabama, have invented certain new and useful Improvements in Plow-Fenders; and I do declare the following to be a full, clear, and exact description of the invention, such as will enable others skilled in the art to which it appertains to make and use the same.

My invention relates to plow-fenders.

The object of the invention is to provide a device of this character which shall be simple of construction, durable in use, and comparatively inexpensive of production, and which may be easily and readily attached to the plows now in general use.

With these objects in view the invention consists of certain features of construction and combination of parts, which will be hereinafter fully described and claimed.

In the accompanying drawings, Figure 1 is a perspective view of a plow, showing the application of my invention thereto. Fig. 2 is a detail perspective view of the fender removed.

In the drawings, 1 denotes the plow, to the beam 2 of which are clamped two plates 3 by means of bolts 4. The upper ends of these plates are provided with apertures 5. In these apertures is journaled the crank-arm 6 of a spindle 7, having journaled on its lower end a rotary disk 8. A bail 9 is journaled on the crank end of the spindle between the upper ends of the plates and is provided with a set-screw 10, by means of which the crank-arm may be secured in lateral adjustment. This set-screw is provided with a squared aperture to form a wrench, by means of which the nuts secured to the bolts may be loosened for the purpose of adjusting the fender longitudinally on the plow-beam. In plowing it will be seen that the disk will roll upon and conform to the surface of the ground, as it has a rocking movement in its bearings, and will not in the least interfere with the progress of the plow.

The fender may be moved laterally by releasing the set-screw from the crank end of the spindle and secured in its adjusted position, bringing the disk close to the plow, thus allowing the plow to run close to the plants.

To adjust the fender longitudinally of the beam, the set-screw is removed, and by means of its wrench-shaped end the nuts on the bolts are loosened, and the plates may then be slid on the beam to the desired point. The nuts are then tightened to secure the fender in its proper adjustment.

The device is exceedingly simple and may be manufactured at a small cost and be attached to any of the plows now in general use and will perform its function in an efficient manner.

From the foregoing description, taken in connection with the accompanying drawings, the construction and operation of the invention will be readily understood without requiring an extended explanation.

Although I have shown and described the preferred form of my invention, it is evident that slight changes may be resorted to without departing from the spirit thereof, and I do not, therefore, wish to be restricted to the construction herein shown and described.

Having thus described my invention, what I claim, and desire to secure by Letters Patent, is—

1. The combination with clamping plates, having at their upper ends apertures, a crank spindle journaled in said apertures and provided with a rotary disk, a bail journaled on said crank spindle between the upper ends of said clamping plates, a set screw working through the bail to clamp the crank spindle in lateral adjustment and to prevent of its rocking movement, substantially as set forth.

2. The combination with a plow beam, of clamping plates connected therewith to be adjusted longitudinally thereto and provided with apertures in their upper ends, a crank spindle journaled in said apertures and provided at its free end with a rotary disk, a bail journaled on said crank spindle and located between the upper ends of said clamping plates, and a set screw working through said bail for the purpose of clamping said crank spindle in lateral adjustment, said crank spindle having a free tilting or swinging movement, substantially as set forth.

In testimony whereof I affix my signature in presence of two witnesses.

JOHN H. FROST.

Witnesses:
M. F. GARDNER,
W. E. FANCHER, Jr.